United States Patent
Zoppi et al.

(10) Patent No.: US 8,495,811 B2
(45) Date of Patent: Jul. 30, 2013

(54) BENCH AND METHOD FOR THE SUPPORT AND MANUFACTURING OF PARTS WITH COMPLEX GEOMETRY

(76) Inventors: Matteo Zoppi, Genoa (IT); Rezia Molfino, Genoa (IT); Dimiter Zlatanov, Genoa (IT)

( * ) Notice: Subject to any disclaimer, the term of this patent is extended or adjusted under 35 U.S.C. 154(b) by 0 days.

(21) Appl. No.: 13/701,215

(22) PCT Filed: May 31, 2011

(86) PCT No.: PCT/EP2011/058992
§ 371 (c)(1),
(2), (4) Date: Nov. 30, 2012

(87) PCT Pub. No.: WO2011/151349
PCT Pub. Date: Dec. 8, 2011

(65) Prior Publication Data
US 2013/0067716 A1    Mar. 21, 2013

(30) Foreign Application Priority Data
Jun. 3, 2010   (IT) .............................. GE2010A0063

(51) Int. Cl.
*B23Q 3/00*   (2006.01)
(52) U.S. Cl.
USPC ........... 29/464; 29/559; 29/281.1; 269/289 R; 269/903

(58) Field of Classification Search
USPC ................. 269/21, 289 R, 903; 29/464, 466, 29/467, 468, 559, 281.1, 281.3
See application file for complete search history.

(56) References Cited

U.S. PATENT DOCUMENTS

| | | | |
|---|---|---|---|
| 3,550,245 A * | 12/1970 | Davis | 29/407.05 |
| 4,805,887 A | 2/1989 | Ray | |
| 5,625,959 A | 5/1997 | Ercole et al. | |
| 6,702,268 B1 * | 3/2004 | Nascimben | 269/21 |
| 6,817,601 B2 * | 11/2004 | Schmalz et al. | 269/21 |

FOREIGN PATENT DOCUMENTS

DE    102005028794 B3    9/2006

* cited by examiner

*Primary Examiner* — Jermie Cozart
(74) *Attorney, Agent, or Firm* — Themis Law

(57) ABSTRACT

A bench for the support and manufacturing of parts with complex geometry includes a support base on which one or more mobile units of support/manufacturing move. The mobile units of support/manufacturing can move and relocate independently from other ones on the surface of the support base. The mobile units of support/manufacturing include at least two adhesion feet configured to connect to anchoring elements distributed on the surface of the support base. The anchoring points are distributed on the surface of the support base with a predefined distribution according to a geometry, such that the distance between any anchoring point, and the corresponding anchoring element, from any other said anchoring point, and the corresponding anchoring organ, in the immediate vicinity of the anchoring point and the corresponding anchoring organ, is constant and equal to the radius of a predefined circle.

22 Claims, 10 Drawing Sheets

BENCH AND METHOD FOR THE SUPPORT AND MANUFACTURING OF PARTS WITH COMPLEX GEOMETRY

FIELD OF THE INVENTION

The present invention relates to a support bench for the support and manufacturing of parts with complex geometry, which includes a support base on which one or more mobile units of support/manufacturing move. Those mobile units of support/manufacturing can move each one independently from the other ones on the surface of the support base, and are equipped with at least two adhesion feet able to connect to anchoring elements distributed on the surface of the support base.

BACKGROUND OF THE INVENTION

Supporting (fixturing) and manufacturing of workpieces with complex geometry are frequent in the manufacturing of parts of aircrafts and automobiles. The workpieces to support and fixture can be very flexible and thin. Typical manufacturing operations to execute are drilling, holing, opening of windows, welding. Generally, especially for aircrafts, the workpieces are large and consequently very deformable, therefore the supporting (fixturing) device must be able to preserve the geometry of the workpiece preventing deformations caused by uneven distributions of the support. Such deformations would result in rejection of the workpiece.

The supporting (fixturing) devices commonly in use have a surface in contact with the workpiece fixed or in part adaptable to the geometry of the workpiece. Reconfigurable supporting (fixturing) devices have been proposed comprising actively or passively movable supports which can be moved to conform to the workpiece geometry and can then be blocked, freezing the shape.

Such adjust-and-freeze supporting devices work satisfactorily with workpiece geometries in a limited range. They are not technically efficient with workpieces with significantly different shapes while they are particularly convenient for repeated operations on a limited set of geometries. Also from an economic point of view, these adjust-and-freeze supporting devices are convenient in the case of repeated manufacturing operations on workpieces with similar geometries since the cost of one supporting device is spread over several workpieces.

An example for the support of thin bodies can be found in EP1245317.

Adaptable supporting (fixturing) devices have been proposed that consist of a matrix of support points or areas, each one mounted on a device able to move those supporting points with a mobility depending on the complexity of the geometry of the workpiece to support.

The configuration of the geometry of the support may be either manual or automatic and is always performed before the positioning of the workpiece.

An example of this type of devices is in EP1728594. It comprises matrices of posts rigidly connected to a common base frame. The posts have variable lengths with elements of interfacing to the supported workpiece at the free extremity.

Alternatively, it is possible to use systems comprising mobile elements of support connected to a common base frame or with extensible or articulated support units as described in WO2007010355 and U.S. Pat. No. 5,732,194.

Furthermore, support systems have been proposed, as in JP9061103, comprising independent support units that can be positioned and fixed to a common frame and so adapted to the surface of the body to support.

The supporting devices with an entirely adjustable surface have the disadvantage to be complex and with high cost, especially if used for large bodies requiring a high density of support points to prevent deformation.

Finally, the supporting devices with independent support units have the disadvantage that the manufacturing process must be interrupted for adjustment and moreover the adjustment requires in the majority of the devices significant operations (often manual). An external measuring system is required (e.g. laser) for the fine-tuning of the positions of the supports, further increasing the time and labor required at any reconfiguration.

Continuous adaptable/reshapable envelopes, with dimensions comparable to the ones of the body to support, have been proposed as an alternative to the systems composed of independent support units. They are filled with material (e.g. magnetorheologic) whose physical state can be commanded and changed between deformable (e.g. fluid or plastic) and stiff, so that the envelope can take and keep shapes that are also significantly different.

This solution presents problems if applied to the support of workpieces subject to mechanical manufacturing and machining since typical machining operations like drilling, welding, milling may damage the envelope.

Moreover, since machining requires in general a high density of supports (to provide proper and stiff fixturing), large bodies have to be manufactured in different phases (subregion by subregion): the manufacturing operations are carried out in a region and the support (fixturing) can be conveniently concentrated in that region where stiffness and load capacity are required.

Inevitably, machining operations produce swarf which deposits on the common base frame over which the support units move. This complicates or makes impossible the motion and repositioning of the support units without manual cleaning of the base frame and consequent interruption of the manufacturing operations.

An unsatisfied practical need exists of a device for the support of workpieces with complex geometry, said device being able to provide automatically a continuous support preventing the deformation of the workpiece in the region subject to machining, using for this purpose simple and cost-effective solutions, overcoming the need for manual intervention during the progression of the manufacturing operations.

SUMMARY OF THE INVENTION

The invention meets the goals mentioned above. It provides a bench for the support and manufacturing of parts with complex geometry, which includes at least one support base with a defined surface on which a number of anchoring points are distributed according to a predefined geometry.

One or more mobile units of support/manufacturing move independently on the surface of said support base. Each said mobile unit comprises a frame with at least two adhesion feet, each said adhesion foot comprising an adhesion device which can be activated/deactivated, said adhesion device being capable to cooperate with a corresponding adhesion organ belonging to one of a plurality of anchoring elements.

Said anchoring elements are distributed on the surface of said support base in such a way that each said anchoring element is positioned at one of said anchoring points. Said anchoring points and the corresponding said anchoring elements are distributed on the surface of said support base accordingly to a geometry such that the distance between any said anchoring point, and corresponding anchoring element, from any other said anchoring point, and corresponding anchoring organ, in the immediate vicinity of said anchoring point and corresponding anchoring organ, is constant and equal to the radius of a predefined circle.

Said adhesion devices of said at least two adhesion feet have a distance between each other equal to the measure of said radius.

Said adhesion feet are able to turn with respect to the frame of the mobile unit of support/manufacturing, said rotation being about an axis through any of said anchoring points and orthogonal to said support base, the corresponding said anchoring feet being engaged to one said anchoring point.

Said unit of support/manufacturing comprise devices for the actuation of the angular displacement of said adhesion feet and devices operating the activation/deactivation of said anchoring organs belonging to the corresponding adhesion feet, for the connection/disconnection to the anchoring organs belonging to the corresponding anchoring elements. Anti-rotation elements are present to constraint the relative rotation of the anchoring foot with respect to the corresponding anchoring element, the axis of the constrained rotation being therefore the axis about which said frame of said unit of support/manufacturing rotates with respect to said support base. In this way, the rotation of any unit of support/manufacturing about an axis through one of said anchoring points, at which one of said anchoring feet is connected to the corresponding anchoring element, causes the rotation of the at least one further anchoring foot present in said unit of support/manufacturing and said at least one further anchoring foot is moved at one said anchoring element corresponding to one of the said anchoring points immediately adjacent to said anchoring point at which said unit of support/manufacturing is connected, being possible to said at least one further anchoring foot to connect to said anchoring element corresponding to one of the said anchoring points immediately adjacent to said anchoring point at which said unit of support/manufacturing is connected.

So, the repositioning of said mobile unit is obtained by means of a rotation of its frame about one said anchoring foot and this rotation is obtained by means of angular rotation actuators and by means of devices commanding the activation/deactivation of said anchoring elements. Anti-rotation elements are used to constraint the relative rotation of the anchoring foot with respect to the corresponding anchoring element determining the rotation of said frame.

In order to make these motions possible and in order to optimize the perfect geometric correspondence between the anchoring points and the anchoring elements, the anchoring elements and/or anchoring organs can be placed on said support base at the vertices of regular polygons distributed side by side with at least one side in common.

In a special embodiment of the invention, said anchoring points and consequently said corresponding anchoring elements are equally spaced between each other and the single anchoring points are at the vertices of equilateral triangles. This relative position is analogously considered for the anchoring feet and for the anchoring organs of the mobile units.

Moreover, in an improvement version of the present invention, the anchoring organs are placed at a certain distance from the surface of said support base and in particular they are positioned over extrusions available on the support base at said anchoring points, said extrusions having same height and being spaced in a way to generate a network of channels.

The positioning of the anchoring elements (about which the rotation of the frame of said mobile units occurs) at a certain distance from the surface of the support base, avoids that swarf produced during manufacturing may obstacle the motion of the mobile units. Such swarf can deposit in the region comprised between the surface of the support base and the units of support/manufacturing.

Moreover, a further variant of the present invention comprises regions for the collection of swarf generated during the manufacturing, these regions being realized on the surface of the support base and possibly being openings and/or channels and/or depressions for collection, removal or accumulation.

For the same aim, it is particularly convenient to position brushing means on said mobile units of support/manufacturing, these brushing means being positioned between said units and the surface of the support base, in such a way that they correspond to the regions of collection of the swarf. During the angular displacement of the mobile units, said brushing means are guided along the channels and/or depressions and above the openings with the aim to push the swarf inside these depressions and/or openings.

As already described above, said anchoring feet may turn about the frame of said mobile units of support/manufacturing, and organs for the actuation of the rotation are used together with a transmission system transmitting the motion of such actuation organs to each anchoring foot belonging to the same mobile unit.

The motorized organs realizing the repositioning of the mobile units and of their anchoring feet, and realizing also the activation/deactivation of the anchoring elements may be powered using electrical signals or compressed fluids.

The invention considers also the incorporation in the anchoring feet and in the anchoring elements of connectors for the connection of feeding lines for electrical signals and compressed fluids. These connectors comprise a first part of an electrical and/or pneumatic connector embedded inside the anchoring feet, and which is connected to a corresponding line of transmission of electrical and/or pneumatic or hydraulic fluid embedded into the mobile unit. Analogously, a second part of an electrical and/or pneumatic connector (compatible with said first parts) is embedded in each anchoring element belonging to the support base, these second parts being connected to corresponding lines of transmission of electrical and/or pneumatic or hydraulic fluid embedded into the support base.

The first and second part of each connector are positioned in a way that they coincide and establish contact and communication between the mobile unit and the support base when the anchoring feet are connected to the anchoring organs. With this solution, no cable for the communication between support base and mobile units is required, simplifying the motion of the mobile units, since cables, especially with angular displacements and rotations, may limit the motions and may need the involvement of a human operator to unwrap cables.

With technical advantage, the electrical and/or pneumatic transmission lines communicate with an electronic control unit considered inside the mobile unit of support/manufacturing. Said control unit is able to manage the communication between the support base and the mobile units and, as described in the following, it is possible to use information and logical processors for the execution of a logical program allowing the mobile unit to move accordingly to a predetermined or elaborated path on the surface of the support base or to possibly communicate with other mobile units belonging to the same support base.

Moreover, following a further refinement of the invention, mechanical interfaces for the connection of mechanical and process tools, typically used in the manufacturing of bodies with complex geometry, are foreseen on the frame of the mobile unit of support/manufacturing.

A constructive variant of the present invention has the bench for support/manufacturing, object of the present invention, with two or more mobile units on the same support base.

In this case, a centralized command unit controls the motion of the mobile units and comprises means for the elaboration of the paths of the single mobile units and of the chronologic priorities of repositioning of the mobile units. These elaboration means are responsible for the definition of the paths that the mobile units must follow. They are also responsible for the sequence of the actions and events that have to be followed to perform the manufacturing: these elaboration means know initial and final positions of each mobile unit on the surface of the support base and they send motion command signals to each single mobile unit, identified by means of identification codes or addresses univocally associated to each single mobile unit.

Preferably, commands to the single mobile units are sent in the form of electrical signals which are transmitted to the mobile units through the communication lines integrated in the anchoring elements and anchoring feet described above.

Alternatively, the centralized command unit can communicate and transmit said motion signals to the mobile units wireless, having suitable communication means mounted in the centralized command unit and in the mobile units, e.g. using radio wave communication.

Accordingly to another actuation solution, two or more mobile units are present on the same support base: each single mobile unit comprises elaboration means with a virtual map of the whole surface of the support base and it can plan and execute motions along the determined paths, between departure and arrival locations. The arrival locations of each single mobile unit can be determined either manually by an external human operator who loads in the command unit information about the arrival location, or automatically by the mobile unit itself on the basis of the geometry of the workpiece and/or type of manufacturing operations and/or number of mobile units present.

Preferably, each mobile unit of support/manufacturing may be equipped with position sensors capable of transducing either their position in the virtual map of the support base, or the position of the other mobile units, or both.

Moreover, it is possible to arrange in order that the mobile units communicate between each other. In this case, each mobile unit comprises means of receiving and transmission which, in combination with the elaboration means described above, and with the position sensors in each mobile unit, make each mobile unit capable to communicate with any other mobile unit, so that for example each single mobile unit may agree with the other mobile units the path and/or the chronologic priorities of the motions avoiding collisions.

The invention comprises also a method for the support and manufacturing of bodies with complex geometry comprising one or more mobile units of support/manufacturing moving on a surface of support.

The method foresees, first, the decision of a distribution of anchoring points, required for the connection of each mobile unit on the surface of the surface of support: said distribution must have any two anchoring points at an equal and constant distance.

In the following, at least two anchoring feet are considered on each mobile unit so that each mobile unit can cooperate and connect/disconnect with at least two anchoring elements corresponding to two anchoring points.

The following step deals with the motion of the mobile units along the surface of the support base: this is an angular displacement about one, of the at least two, anchoring foot which is connected to one anchoring element, and it consists in a rotation of the mobile unit about an axis through the anchoring point corresponding to the anchoring element to which the anchoring foot is connected and perpendicular to the surface of the support base. Consequently, one of the anchoring feet is connected to one anchoring element, while the at least one more anchoring foot is moved by the rotation in correspondence with another anchoring point different from the one where it was before the start of the angular step.

After, such displacement of the mobile unit is executed in sequence but changing the anchoring feet and corresponding anchoring elements connected, such that the mobile unit may move along the whole surface of the support base.

As an improvement, the method comprised in the present invention may assume that each mobile unit has three or more anchoring feet involving three or more different anchoring elements coinciding with three or more anchoring points, which are distributed on the surface of the support base at the corners of an equilateral triangle in the case of three anchoring points, and at the corners of any regular polygon with a number of edges equal to the number of anchoring points.

With technical advantage, the method comprised in the invention requires that while the frame of the mobile unit rotates, each anchoring foot belonging to the same mobile unit rotates with respect to this common mobile unit's frame. Anti-rotation constraints are therefore present and they constrain the anchoring foot which is connected to a corresponding anchoring element, with the result that the frame rotates about the anchored foot itself and the other anchoring feet, to which the anti-rotation constraint is not applied in that phase, rotate about the mobile unit frame of an angle of rotation equal and opposite to the one of the mobile unit.

The invention also comprises a bench for the support/manufacturing of parts with complex geometry, this bench comprising one or more mobile units of support/manufacturing able to move on a support base having on its surface a sequence of extrusions distributed accordingly to a determined geometry, preferably in a way that each extrusion has the same distance from the surrounding extrusions.

These extrusions are surrounded by a network of channels which may communicate with openings that may be present, such as openings in the support base, used to remove manufacturing swarf produced during the manufacturing.

The mobile unit is equipped with means for the connection to the support base and it is equipped with means to induce the displacement of the mobile unit along said support base. Such means cooperate with the surfaces of the extremities of said extrusions on the support base in order to generate actions inducing the motion of said mobile unit.

In a specific design of the invention, the mobile unit comprises a frame and two or more anchoring feet positioned at a distance equal to the distance between consecutive extrusions on the support base. These anchoring feet cooperate with the extrusions on the support base in order to realize the motion of the mobile unit on the surface of the support base, from one extrusion to another.

The invention also comprises a method for the support and manufacturing of bodies with complex geometry, this method comprising one or more mobile units of support/manufacturing moving on a support base.

The first step of the method deals with a geometric distribution of anchoring points on the surface of the support base in such a way that the anchoring points are equally spaced and coincide with anchoring elements positioned at a distance above the surface of the support base.

Afterwards, controllable anchoring means positioned between the anchoring feet and the anchoring elements allow the motion of the mobile units between any one anchoring point and another.

Finally, swarf produced during the manufacturing accumulates on the surface of the support base.

The configuration of the bench described and the related steps of the method disclosed have the relevant advantage that the mobile units do not suffer any limitation to their motion due to the presence and accumulation of swarm caused by the manufacturing processes.

In addition to what is described above, it will be possible to realize the motion of the mobile units by means of a frame with telescopic arms connected to the anchoring feet: becoming longer, the arm moves the anchoring foot from a position corresponding to an anchoring element to a position corresponding to one surrounding anchoring element. Afterwards, the telescopic arm shortens and, since the anchoring foot at its extremity is connected to the support base, then the arm moves the rest of the mobile unit including the other anchoring feet.

In addition, the mobile unit has a motion of translation and not of rotation, but also in this case the manufacturing swarf does not obstruct the motion of the mobile unit.

Other alternative embodiments of the invention use magnetic forces to generate an attraction force between the mobile units and the extrusions on the support base, while the mobile units are equipped with at least a pair of tracks with length higher than the distance between two adjacent extrusions, said tracks being in contact with the top surfaces of the extrusions.

The invention comprises also other characteristics, which further improve the bench for support/manufacturing and which are recited in the claims.

BRIEF DESCRIPTION OF THE DRAWINGS

These and other characteristics and advantages of the present invention appear more clearly from the following description of some embodiments which are shown in the drawings attached, where.

DETAILED DESCRIPTION OF EMBODIMENTS OF THE INVENTION

Figure 1:
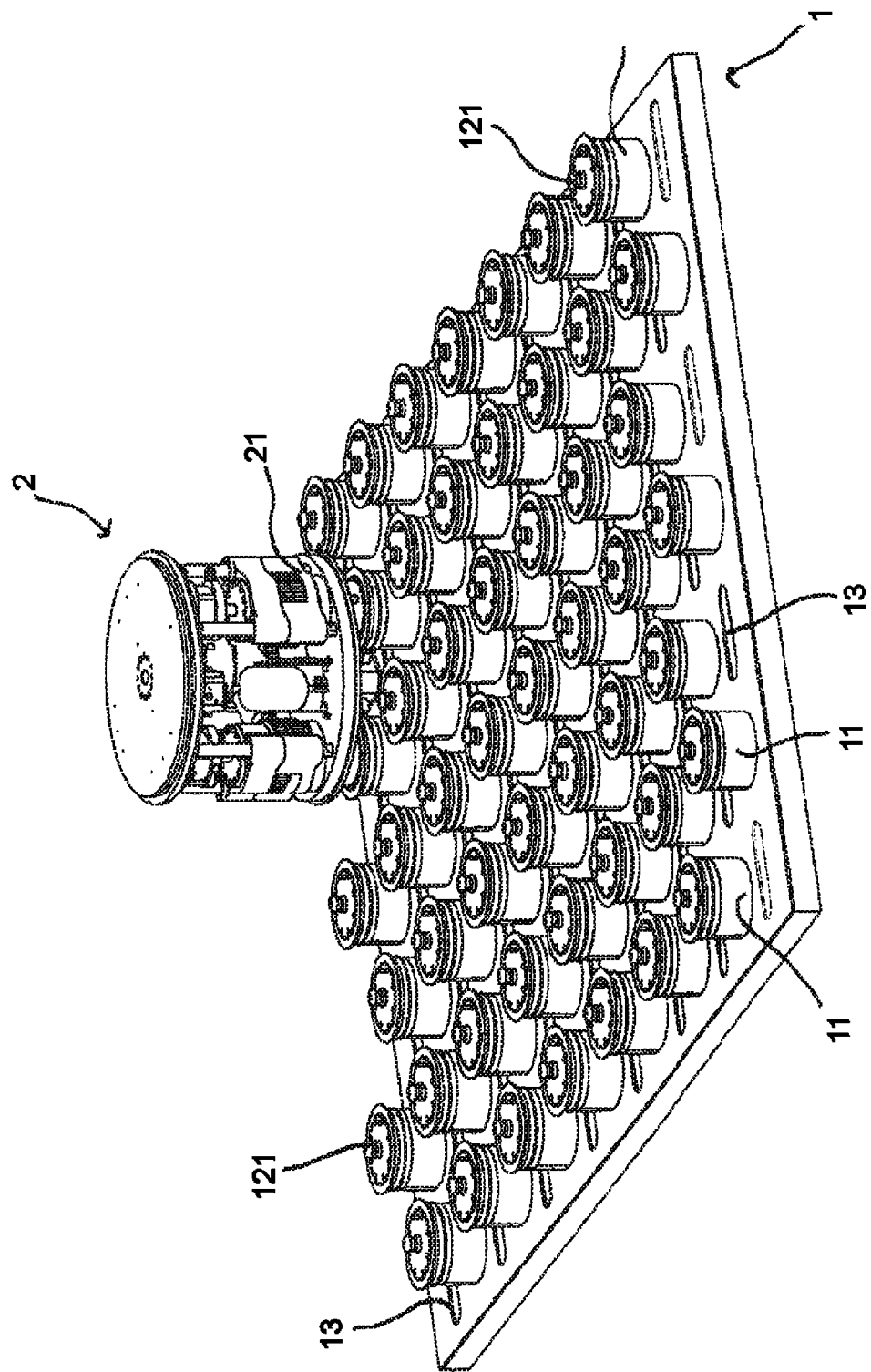
FIG. 1 shows a bench for support/manufacturing according to the present invention in a possible design variant.

FIGS. 1 to 5 show a bench according to the present invention and the different components belonging to it.

The detailed description of FIGS. 1 to 5 refers to a preferred example where a bench according to the present invention has three connection points for each mobile unit. This is a particular case as two or more anchoring feet may be present, as described above.

In particular, a bench for support/manufacturing according to the present invention comprises a support base 1, on which one or more mobile units for support/manufacturing 2 move. The mobile units for support/manufacturing 2 move, each independently from the other ones, on the surface of the support base 1. Each mobile unit 2 comprises three anchoring feet 21 which connect to corresponding anchoring points 11 distributed on the surface of the support base 1.

The anchoring points 11 are distributed on the surface of the support base following a defined geometry such that the distance of any anchoring point 11 from any of the surrounding and immediately adjacent anchoring points 11 is constant and equal to the radius of a predefined circle.

An anchoring element 12 is associated to each anchoring point. Each anchoring element 12 comprises an element with axisymmetric geometry about an axis perpendicular to the surface of the support base. This element with axisymmetric geometry forms an extrusion at the anchoring point 11 which extrudes from the surface of the support base 1.

An anchoring organ 121 is present at the extremity of each anchoring element 12. This anchoring organ 121 is coaxial to the corresponding anchoring element 12. This anchoring organ 121 consists of an axial extrusion with a larger diameter at the free side opposite to the surface of the support base 1.

The anchoring elements 12 and the corresponding anchoring points 11 are distributed on the surface of the support base 1 in a precisely specified order, namely at the corners of sequences of regular polygons positioned side by side each two sharing at least one side. An example is shown in FIG. 1 and FIG. 3 where the anchoring elements 12 are coincident with the corners of equilateral triangles each two of which have one side and two corners in common.

All anchoring elements 12, considered as extrusions, have the same dimension and height with respect to the surface of the support base 1, such that said extrusions are spaced between each other and form a network of channels.

Areas for the accumulation of manufacturing swarf are present on the surface of the support base 1 and are connected with said channels. These accumulation areas are openings 13 distributed according to a predetermined order. In FIGS. 1 and 3 these accumulation areas are positioned between any anchoring element 12 and one immediately adjacent to it.

Figure 3:
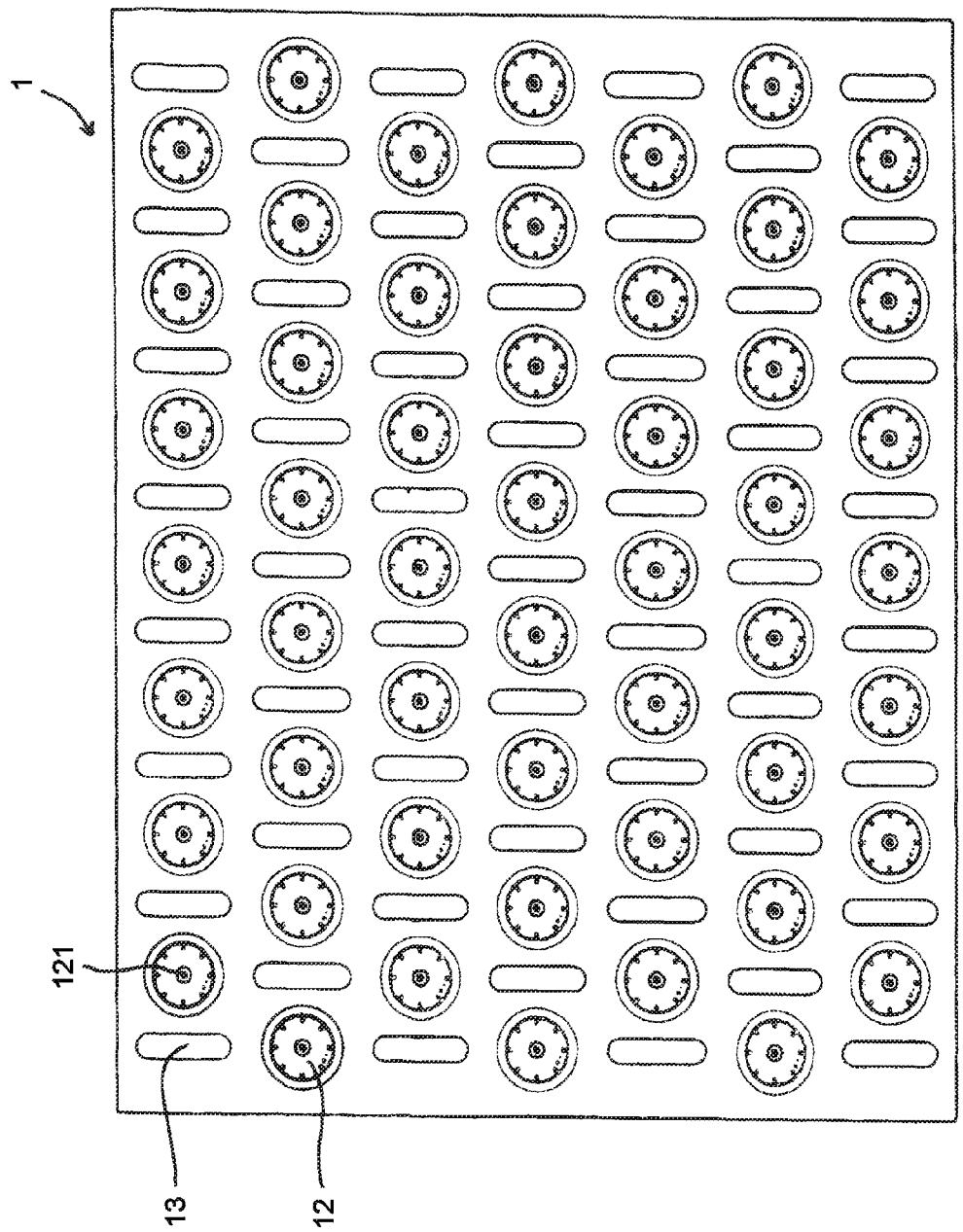
FIG. 3 shows a view of the support base belonging to a bench according to the present invention.
Figure 4A:
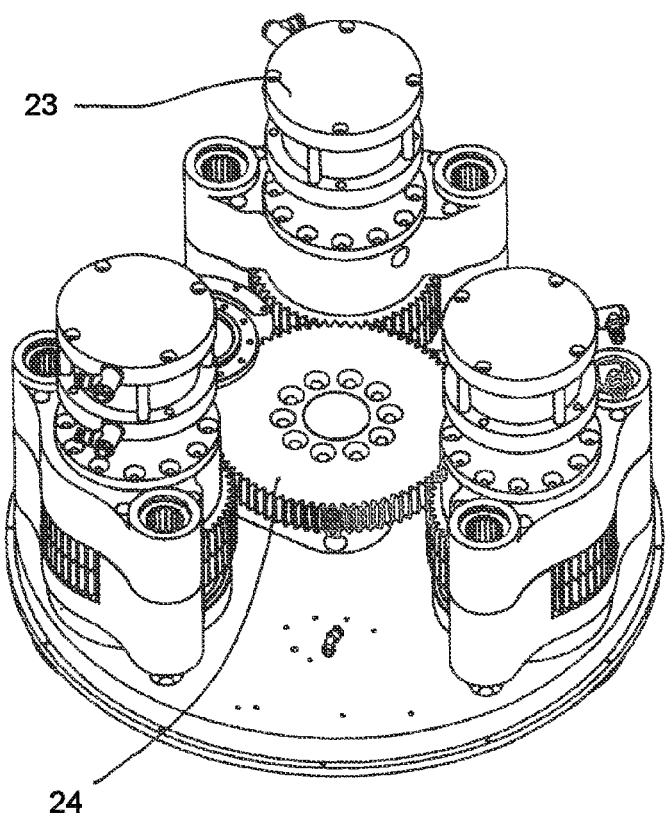
FIGS. 4 and 5 show details of a mobile unit for support/manufacturing belonging to the bench according to the present invention.
Figure 4B:
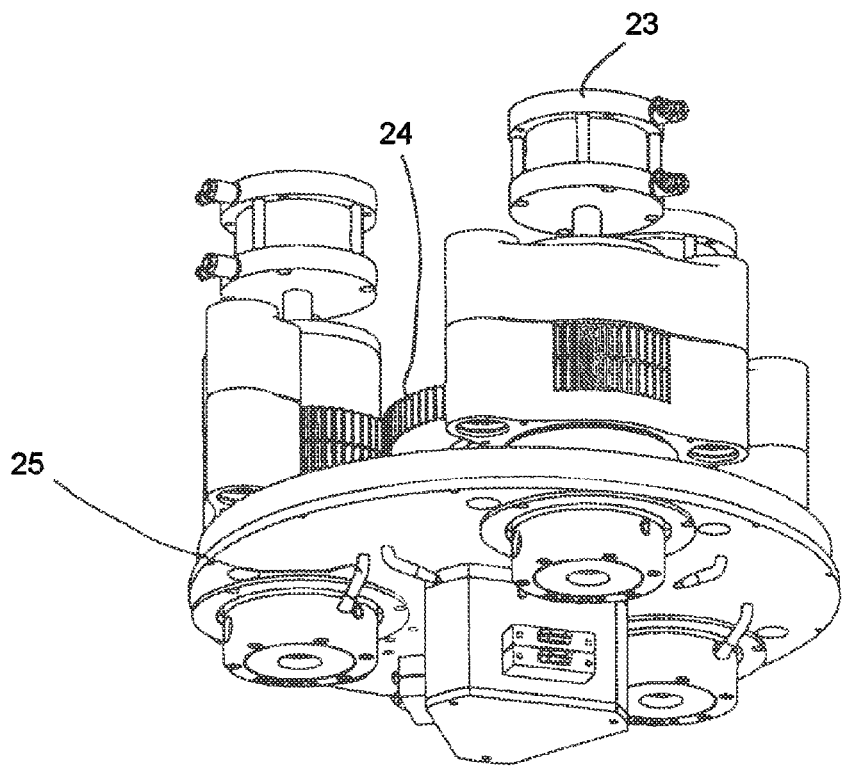
Figure 5:
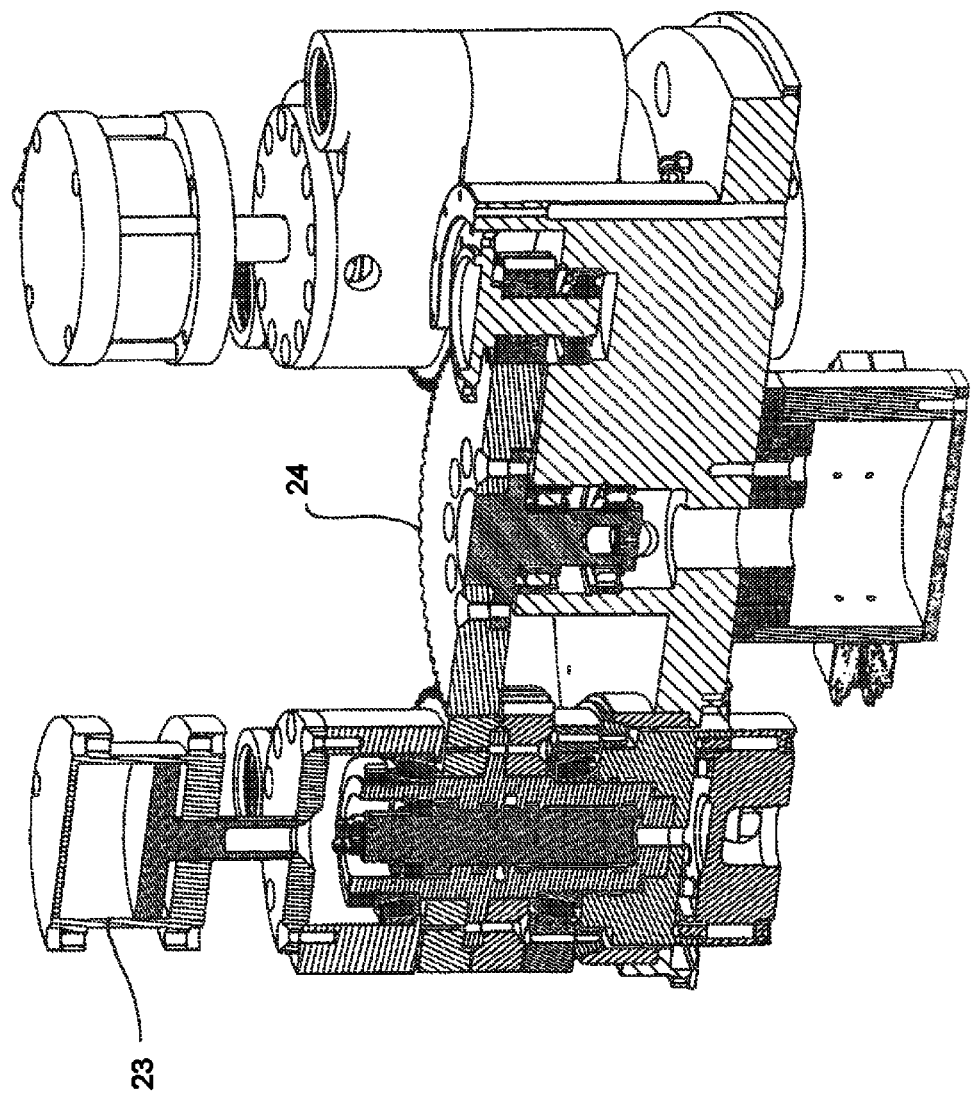

With reference to FIG. 3, the anchoring elements 12 and the openings 13 are organized in rows with a longitudinal offset such that the center of any anchoring element 12 of a row coincides with the longitudinal axis of the opening 13 of the rows immediately adjacent to the anchoring element 12.

Figure 2:
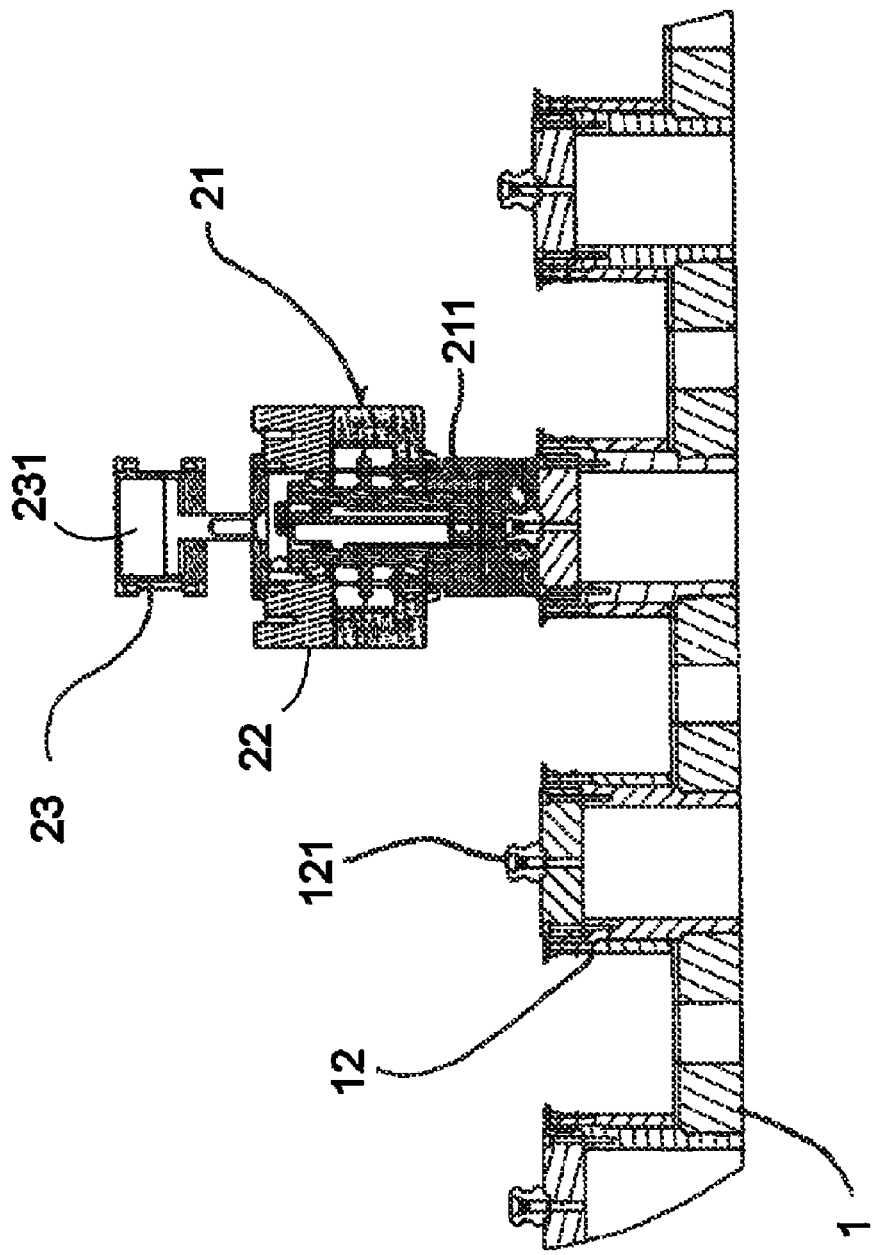
FIG. 2 shows a section of a bench for support/manufacturing of parts with complex geometry according to the present invention.

One or more mobile units 2 move independently on the surface of said support base 1. These mobile units 2 comprise a frame with three anchoring feet 21, each equipped with an anchoring organ 211 (FIG. 2). This anchoring organ 211 may be activated or de-activated according to a condition of engagement with a corresponding anchoring organ 121 belonging respectively to one of a plurality of anchoring elements 12.

The anchoring feet 21 and the anchoring elements 12 comprise connectors for lines of transmission of electrical signals and pressurized fluids. These connectors comprise a first part of an electrical or fluidic connector, which is mounted in the anchoring feet 21 and which is connected with a corresponding transmission line of electrical signals and/or pressurized fluid present in the mobile unit 2.

Analogously, a second part of the connector is mounted in each anchoring element 12 belonging to the support base 1. This second part is complementary to said first part of the connector and it is connected with a line of transmission of electrical signals and/or pressurized fluids present in the support base 1.

The first and second part of each connector are positioned in a way so they coincide when the anchoring feet 21 are connected to the anchoring elements 12, thus establishing contact and communication between the mobile unit 2 and the support base 1.

With special reference to FIGS. 1 to 5, the mobile unit for support/manufacturing 2 comprises an axisymmetric cylindrical frame 22 having on one of the two bases a plate on which three anchoring feet are positioned eccentrically.

Each anchoring foot 21 comprises a cylindrical opening. The anchoring feet are positioned in such a way that their axes intersect the plane of the base plate of the cylinder at the vertices of an equilateral triangle. The anchoring feet 21 can rotate about these axes with respect to the frame 22 of the mobile unit 2.

In particular, these axes are perpendicular to the support base 1 and they pass through the anchoring points 11 belonging to the support base 1 in such a way that the anchoring feet 21 are coaxial to the anchoring elements 12.

The anchoring feet 21 comprise anchoring organs 211 cooperating with the anchoring organs 121 with the aim to present a condition of connection and a condition of disconnection of the anchoring organs 211 with the anchoring organs 121.

In particular, the anchoring organs 211 comprise connection jaws, spaced at equal angles, into openings in their lateral inner surfaces. These jaws interact with the larger diameter extremities of the extrusions present on the anchoring organs 121, being each pair of an anchoring organ cavity and an anchoring organ extrusion axisymmetric with respect to an axis of rotation, relative to the anchoring foot 21, of the frame 22 of the mobile unit of support/manufacturing 2.

Furthermore, the distance between the rotation axes of the anchoring feet 21 in the frame 22 and of the connection cavities in the anchoring feet is equal to the distance between the anchoring points 11 and it is equal to the distance between the axes of the extrusions.

The jaws may be moved alternatively in a direction orthogonal to the lateral surface of the cavities where they reside in the anchoring feet 21. The jaws move between a position of lock of the extrusions on the anchoring organs 121, being the lock obtained because the space available for the extrusions to slide out of the anchoring organs is smaller than the diameter of their larger extremity, and a position of unlock where the space available for the extrusions to slide out of the anchoring organs is larger than their larger diameter extremities.

The passage between the connected and disconnected configurations of the anchoring organs 211 with the anchoring organs 121 is operated by pneumatic actuation means, in particular by an actuation cylinder 23 coaxial to the anchoring foot 21 which presents a feeding duct 231 along the entire length of the actuation cylinder 23.

When the anchoring feet 21 are connected to the anchoring elements 12, the feeding duct 231 is in communication with another feeding duct belonging to the anchoring elements 12 and coaxial to the anchoring organs 121, used for the feeding of the pressurized fluid required for the motion of the actuation cylinder 23.

The actuation cylinder 23, therefore, fed by the pressurized fluid, moves in the direction of the axis passing through the anchoring point 11 and perpendicular to the support base 1, having a refracted and an extracted position: the commutation between these two positions allows to connect and disconnect the anchoring feet 21 with respect to the anchoring elements 12.

Moreover, in combination with this commutation of connection/disconnection, the extra stroke of the actuation cylinder 23 allows the anchoring feet 21, after disconnection, to lift up in direction of their axis of rotation of a length equal or slightly exceeding the length of the axial extrusion belonging to the anchoring organs 121.

Analogously, the stroke in the opposite direction, along the axis of rotation of the anchoring feet 21 towards the support base 1, is associated with a descending of the anchoring foot 21 and consequent condition of connection of the anchoring organs 211 with the anchoring organs 121.

Motorized means, responsible for the angular displacement of the anchoring feet 21, are considered for the motion of the mobile units for support/manufacturing 2.

Such motorized means may be electrical motors, which are not shown in the figures. When the anchoring organs 211 are connected to the anchoring organs 121, the motorized means transmit their motion by means of the central gear 24 coaxial to the axis through the centers of the bases of the frame 22 and perpendicular to the support base 1.

The gear 24 transmits its rotation to the remaining gears in the transmission which are considered mounted on each anchoring foot 21 coaxially to the axis of the corresponding anchoring foot. This results in the rotation of each anchoring foot about its axis.

Each anchoring foot comprises an anti-rotation constraint realized using a pin 25 which, when engaged, prevents the rotation of the foot 21, while when unengaged allows the rotation. Such pin 25 is normally active and it deactivates when the anchoring organs 211 disconnects from the anchoring organs 121.

When the anchoring organs 211 are connected to the anchoring organs 121, the rotation axes of the feet 21 coincide with the axes through the anchoring points 11 and perpendicular to the support base 1, and they are collinear to the anchoring elements 12.

For the motion of the mobile units of support/manufacturing 2, starting from this configuration with all three anchoring feet connected, only one stays connected: the actuation cylinders of the other two feet 21 are fed with pressurized fluid along the feeding duct 231; they start descending in a direction coaxial to the axis of rotation of the anchoring feet 21; in so doing, they disconnect the anchoring organs 211 from the anchoring organs 121 and they lift up the anchoring feet 21 by a length equal or slightly exceeding the length of the extrusions on the anchoring organs.

The actuation means rotate the gear 24 which transmits motion to all other gears present at each single anchoring foot 21.

The feet which are disconnected have the pin 25 disengaged and are free to rotate about their axes, while the only anchoring foot 21 which is connected has the rotation constrained by its pin 25. Therefore, as a result of the angular motion created by the gear 24, the entire mobile unit 2 receives a motion of angular rotation about the axis through the anchoring point 11 to which the anchoring element 12 connected to the anchoring foot 21 corresponds.

Since the distance between the axes of rotation of the single anchoring foot 21 is the same between the anchoring points 11, and in particular with reference to FIGS. 1 to 3, it is equal to the length of the sides of an equilateral triangle, the motion of rotation of the mobile unit 2 shifts the two anchoring feet 21, which are not connected, from their initial positions up to final positions, which correspond to two anchoring points different from the ones at the initial positions.

At this point, the displacement of the mobile unit of support/manufacturing 2 is achieved by alternating, time by time, the anchoring feet 21, which are connected in such a way that such mobile unit 2 can arbitrarily move along the entire surface of said support based 1.

FIGS. 6a to 6e show schematically the method and the motion steps of the mobile unit belonging to the bench object of the present invention.

The mobile unit 2 is schematically represented by a line and it is shown with two anchoring feet. By analogy, it is easy to extend this methodology to a mobile unit with more anchoring feet.

Moreover, in FIGS. 6a to 6e, the position of the mobile unit 2 is schematically represented using a solid line while a dashed line is used to indicate the position of the mobile unit at a following step of the method.

Figure 6A:
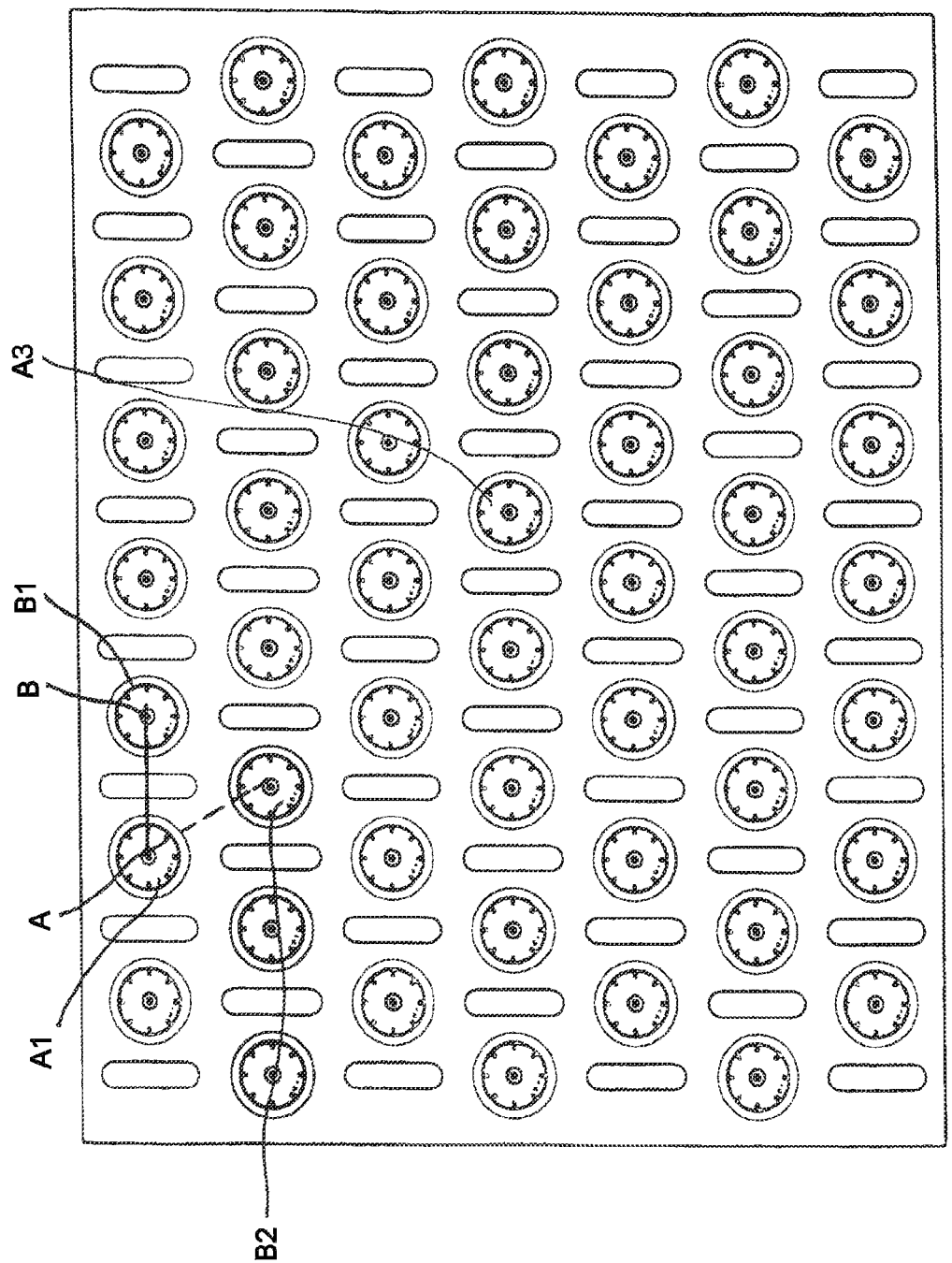
FIGS. 6a to 6e show schematically the method and modes of displacement of the mobile units belonging to a bench according to the present invention.

In FIG. 6a, the mobile unit 2 has the anchoring feet A and B positioned at the points A1 and B1, and the path of the mobile unit 2 comprises an arrival point with one of the two anchoring feet positioned at point A3.

The anchoring foot A is connected to the anchoring elements and is the foot about which the rotation occurs.

Figure 6B:
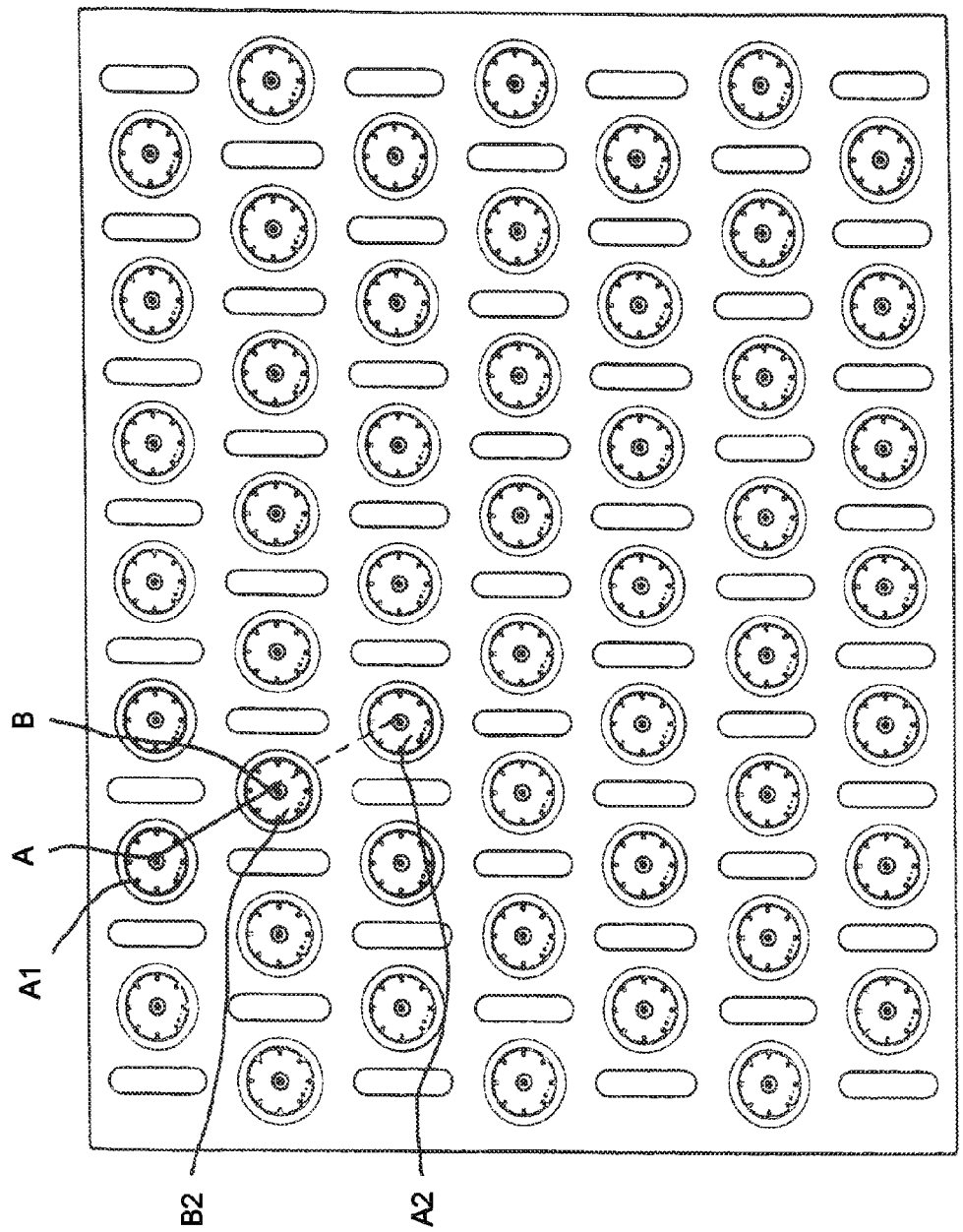

In FIG. 6b, the mobile unit 2 has completed a rotation of 60 degrees about the axis through point A1 and perpendicular to the support base 1, so that the foot B moves to point B2.

At this point, the foot B is connected to its corresponding anchoring elements and is the foot about which the rotation of the mobile unit 2 occurs.

Figure 6C:
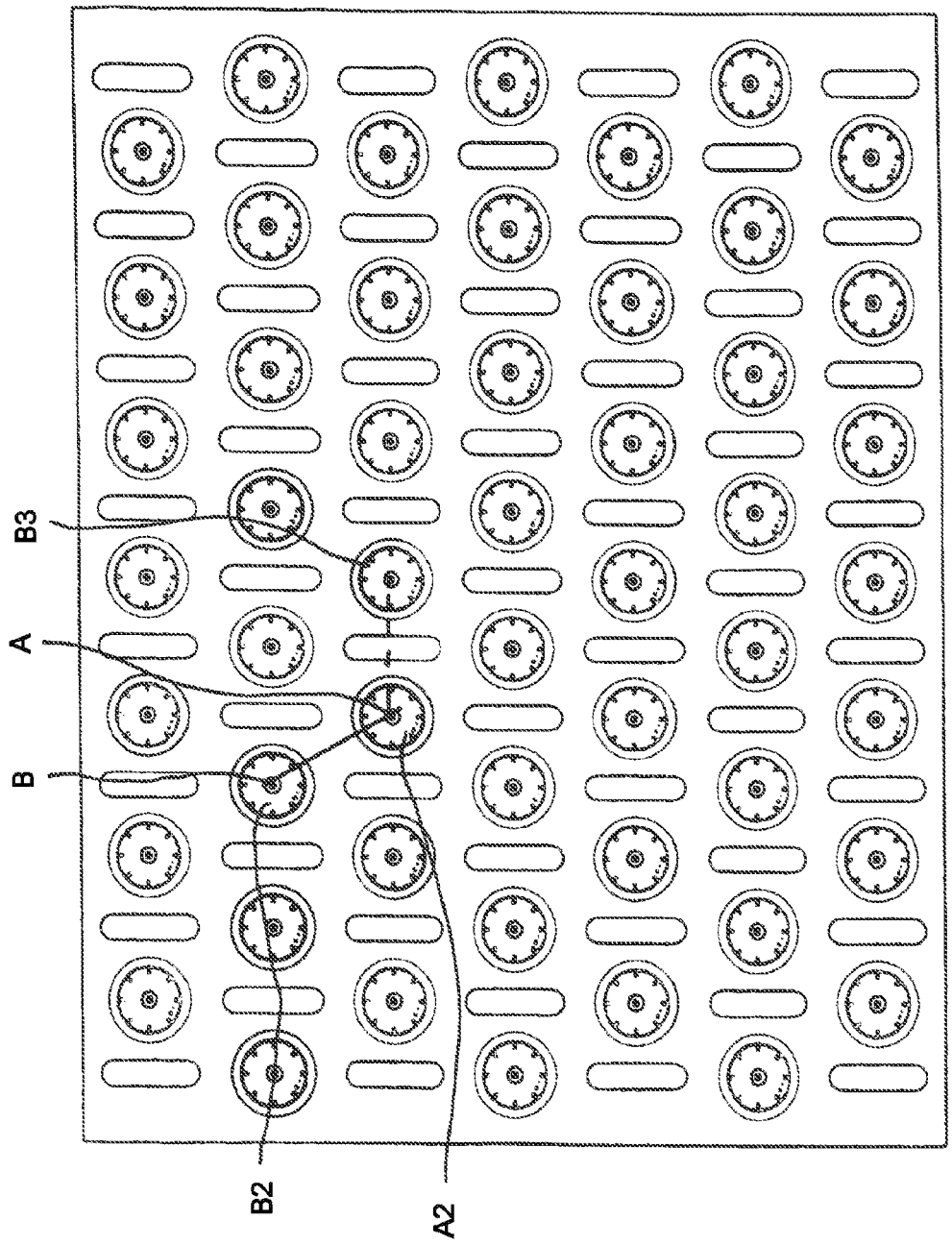

In FIG. 6c, the mobile unit 2 has completed a rotation of 180 degrees about the axis through point B2 and perpendicular to the support base 1, so that the foot A moves to point A2.

At this step, foot A is connected to its anchoring elements and is the foot about which the rotation of the mobile unit 2 occurs.

Figure 6D:
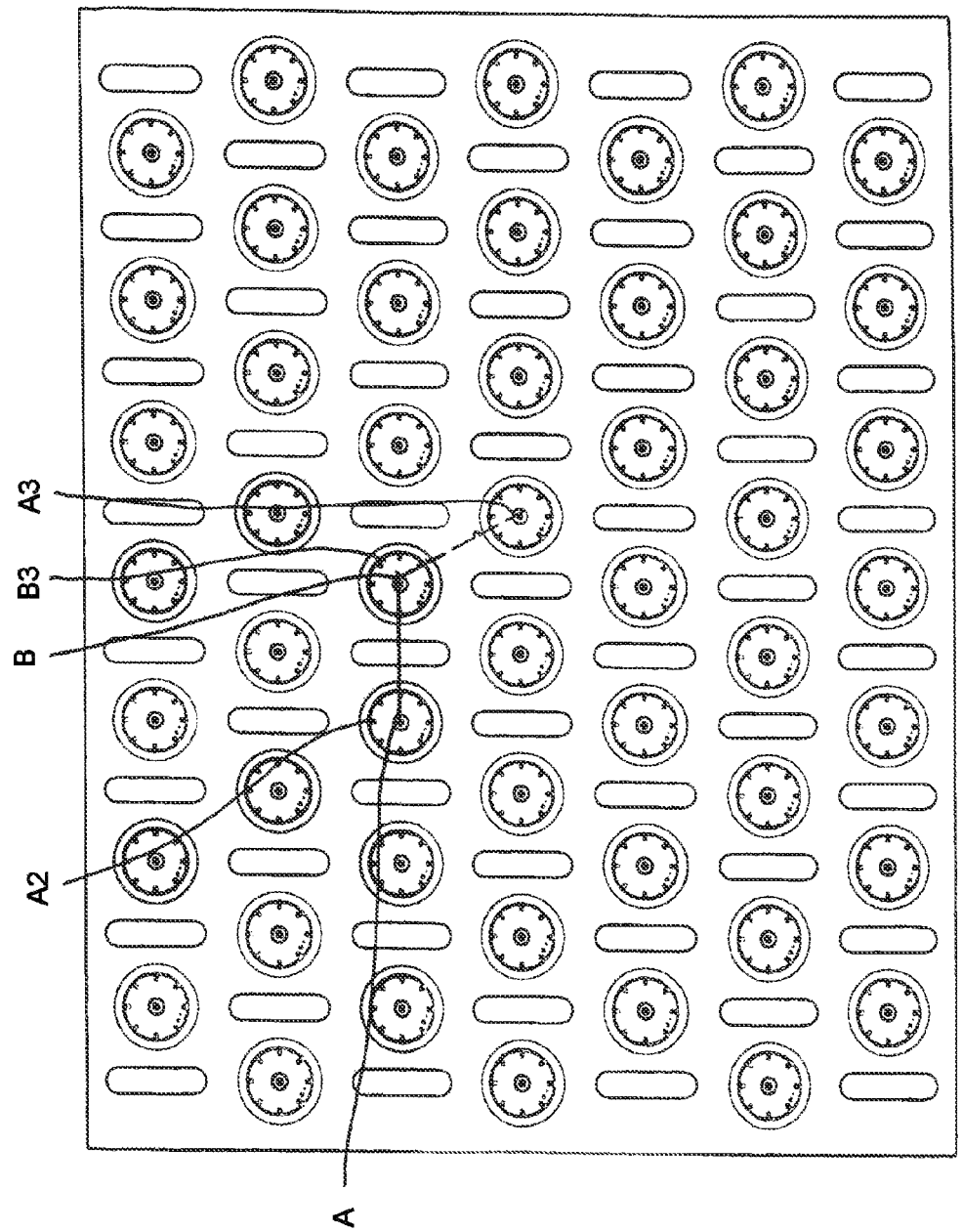

In FIG. 6d, the mobile unit 2 has completed a rotation equal to 120 degrees about the axes through point A2 and perpendicular to the support base 1, so that foot B moves to point B3.

At this step, foot B is connected to its anchoring elements and is the foot about which the rotation of the mobile unit 2 occurs.

Figure 6E:
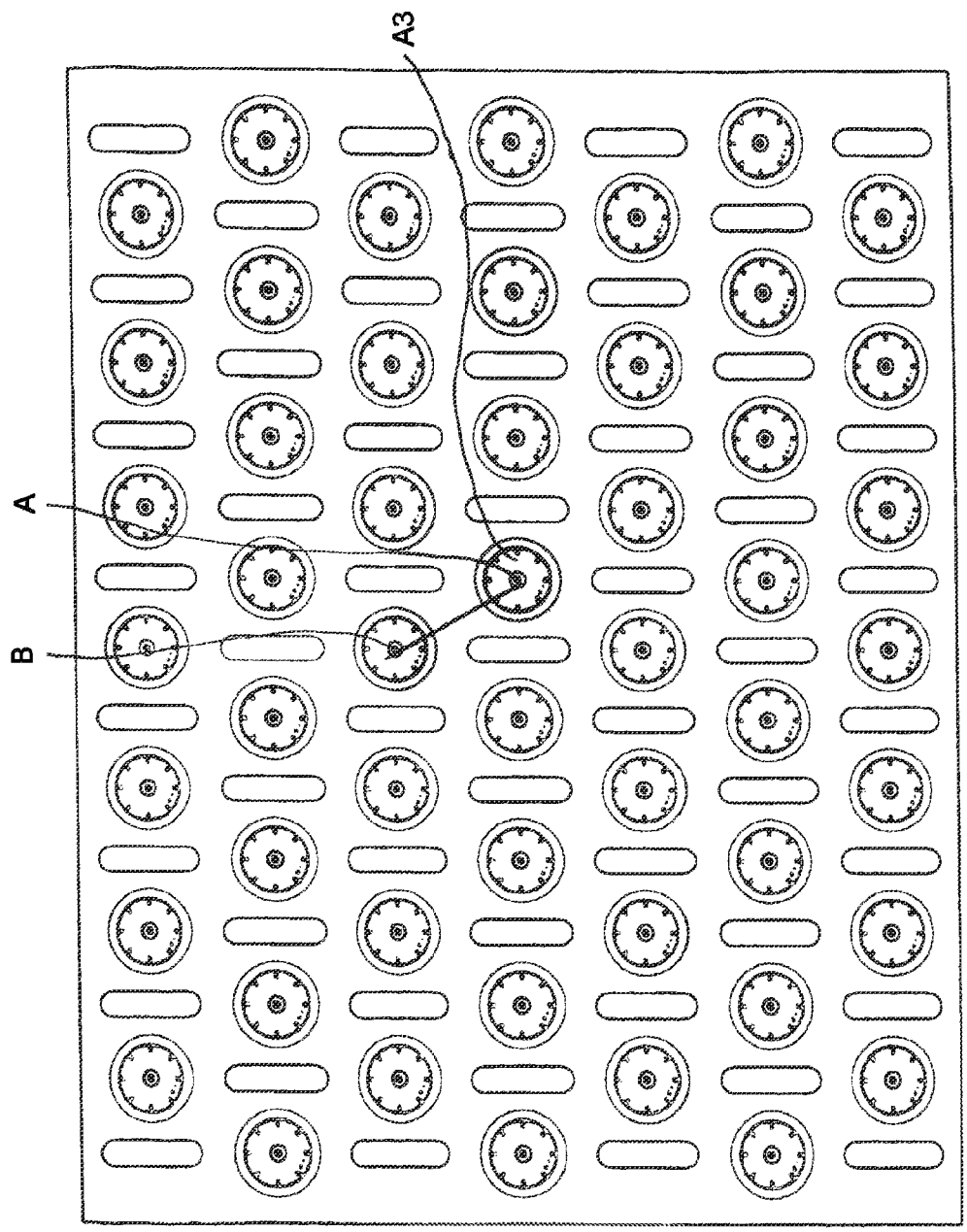

In FIG. 6e, the mobile unit 2 has completed a rotation of 120 degrees about the axis through point B3 and perpendicular to the support base 1, so that foot A moves to point A3, corresponding to the arrival point planned for the mobile unit 2.

The invention claimed is:

1. A bench for support and manufacturing of parts with complex geometry, comprising:
at least a support base having a surface that is defined;
a number of anchoring points distributed on said support base according to a predefined geometry; and
one or more mobile units of support/manufacturing, said mobile units of support/manufacturing being movable each one independently from the other ones on the surface of said support base;
said mobile units of support/manufacturing each one have a frame with at least two anchoring feet, each of said anchoring feet comprising an anchoring device configured to be activated/deactivated, said anchoring device being further configured to cooperate with a corresponding anchoring organ belonging to one of a plurality of anchoring elements;
said anchoring elements being distributed on the surface of said support base such that each of said anchoring elements is positioned at one of said anchoring points;
said anchoring points and the corresponding anchoring elements being distributed on the surface of said support base according to a geometry such that a distance between any one anchoring point among said anchoring points, and a corresponding anchoring element, from any other one of said anchoring points, and corresponding anchoring organ, in an immediate vicinity of said anchoring point and corresponding anchoring organ, is constant and equal to a radius of a predefined circle;
anchoring devices of said at least two anchoring feet having a distance between each other equal to said radius;
said anchoring feet being configured to turn through a rotation with respect to the frame of the mobile unit of support/manufacturing, said rotation being about an axis through any of said anchoring points and orthogonal to said support base, the corresponding anchoring feet being engaged to said anchoring point; and
each unit of support/manufacturing comprising devices for actuating an angular displacement of said anchoring feet and anchoring devices operating an activation/deactivation of anchoring organs belonging to the corresponding anchoring feet for connection/disconnection to the anchoring organs belonging to the corresponding anchoring elements, anti-rotation elements being provided to constrain a relative rotation of an anchoring foot with respect to the corresponding anchoring element, an axis of the constrained rotation being the axis about which said frame of said unit of support/manufacturing rotates with respect to said support base; and
such that a rotation of any unit of support/manufacturing about an axis through one of said anchoring points, where one of said anchoring feet is connected to the corresponding anchoring element, causes a rotation of the at least one additional anchoring foot present in said unit of support/manufacturing and said at least one additional anchoring foot is moved at one anchoring element corresponding to one of the said anchoring points immediately adjacent to said anchoring point at which said unit of support/manufacturing is connected,
thereby causing said at least one additional anchoring foot to connect to said anchoring element corresponding to one of the said anchoring points immediately adjacent to said anchoring point, at which said unit of support/manufacturing is connected.

2. The bench according to claim 1, wherein at least one of said anchoring elements or said anchoring organs are placed on said support base at vertices of regular polygons, said polygons being distributed side by side with at least one side in common.

3. The bench according to claim 1, wherein said anchoring organs of said anchoring elements are placed at a certain distance from the surface of said support base.

4. The bench according to claim 3, wherein said anchoring organs are placed over extrusions available on said support base at said anchoring points, said extrusions having a same height and being spaced to generate a network of channels.

5. The bench according to claim 1, wherein said anchoring feet are configured to turn with respect to said anchoring points, further comprising at least one motor transmitting rotational motion through a transmission to said anchoring feet belonging to a same mobile unit.

6. The according to claim 1, wherein said anchoring feet and said anchoring elements are equipped with connectors for lines of supply of at least one of electrical signals or fluids, said connectors comprising a first part of at least one of electrical or fluidic connector on each anchoring foot, said first part being connected to a line of transmission of at least one of electrical or fluidic signals present on said unit of support/manufacturing, said connectors further comprising a second part of at least one of electrical or fluidic connector complementary to said first part of at least one of electrical or fluidic connector, one second part of at least one of electrical of fluidic connector being present in each said anchoring element and being connected to a line of transmission of at least one of electrical or fluidic signals present in said support base, such that when one anchoring foot is connected to one anchoring element, said first and second part of at least one of electrical or fluidic connector become coincident and provide at least one of electrical or fluidic connection.

7. The bench according to claim 1, wherein said support base has one or more of openings, channels, or cavities for collection, removal or gathering of manufacturing material produced during manufacturing of parts supported by said bench.

8. The bench according to claim 7, wherein some or all of said mobile units of support/manufacturing are equipped with brushes which are moved into and through said channels or cavities and move over said openings, channels, or cavities during an angular motion of said units of support/manufacturing, such to convey inside said openings, channels, or cavities said manufacturing material.

9. The bench according to claim 1, wherein:
said anchoring elements are locking protrusions with axisymmetric geometry and an axis orthogonal to said support base;
an axi-symmetric locking protrusion is placed coaxially over each anchoring element;
said anchoring organ in said anchoring foot comprises a cavity for one protrusion and locking jaws distributed around said cavity;
said jaws are movable and configured to translate to contact said locking protrusion;
when said locking jaws are in contact with said locking protrusion, said locking protrusion are prevented from exiting from said cavity and consequently said anchoring foot is connected to said anchoring element; and
a distance between axes of any two adjacent locking protrusions is equal to a distance between two adjacent anchoring points.

10. The bench according to claim 9, wherein said anchoring feet are movable inward and outward of a length equal or slightly exceeding a length of said locking protrusions present on said anchoring elements, and wherein said anchoring feet are provided with anchoring organs.

11. The bench according to claim 1, wherein said devices for the actuation of the angular displacement of said anchoring feet are electrical actuators which are activated/deactivated accordingly to activation/deactivation of said anchoring elements.

12. The bench according to claim 1, wherein said units of support/manufacturing comprise an electronic unit of control.

13. The bench according to claim 1, wherein said units of support/manufacturing comprise devices and interfaces for connection of tools and devices to carry out manufacturing operations.

14. The bench according to claim 1, wherein on said support base there are mounted at a same time two or more of said units of support/manufacturing, an operation unit for operation of said units of support/manufacturing being provided, said operation unit comprising an operational system that determines repositioning paths and orders and conditions of motion of said units of support/manufacturing based on current and goal positions of said units of support/manufacturing on said support base, command and repositioning signals being transmitted to said units of support/manufacturing, one or more of identification keys or univocal addresses being associated to said unit of support/manufacturing.

15. The bench according to claim 14, wherein said command and repositioning signals are transmitted through lines of electrical transmission embedded in said support base.

16. The bench according to claim 14, wherein said command and repositioning signals are transmitted through a wireless transmitting/receiving system provided on said units of support/manufacturing and on said operation unit.

17. The bench according to claim 1, wherein on said support base there are mounted at a same time two or more of said units of support/manufacturing, each of said units of support/manufacturing comprising an operation unit, said operation unit comprising an operational system that determines repositioning paths and orders and conditions of motion of said units of support/manufacturing according to current and goal positions of said units of support/manufacturing on said support base, said operation unit containing a map of said support base and current positions of said units of support/manufacturing, each of said units of support/manufacturing comprising sensors detecting position of the other of said units of support/manufacturing present on said support base, a command interface for inputting positions of destination of each of said units of support/manufacturing by a human operator or by any other device configured to calculate said positions of destination.

18. The bench according to claim 17, wherein each of said units of support/manufacturing comprises a transmit/receive device that transmits and receives communication with other ones of said units of support/manufacturing, said operational system that determines the repositioning paths and orders and conditions of motion of said units of support/manufacturing comprising a negotiation system that repositions paths and orders and conditions of motion of said units of support/manufacturing, thereby avoiding collisions of said units of support/manufacturing between each other and with an outer environment.

19. A method of making a bench for manufacturing of parts with complex geometry, the method comprising:
providing a support base;
providing one or more units of support/manufacturing configured to move on said support base;
distributing a plurality of anchoring points for said units of support/manufacturing on a surface of said support base, said anchoring points being equally spaced;
providing on each of said units of support/manufacturing at least two anchoring feet configured to anchor two of said anchoring points; and
causing a motion of each of said units of support/manufacturing by angular steps by,
causing a rotation of said unit of support/manufacturing about an axis through an anchoring point at which one of said anchoring feet is connected, and
moving, by said rotation, at least one additional anchoring foot of said unit of support/manufacturing at an anchoring point different from the anchoring point at which said at least one additional anchoring foot was before said rotation had occurred,
wherein said angular steps are carried out one after the other by alternating the anchoring points and the anchoring feet present in said unit of support/manufacturing and connecting at said anchoring points, thereby changing point and axis about which said angular steps occur,
whereby a bench is produced that supports a work-piece in a region subject to machining.

20. The method according to claim 19, wherein said units of support/manufacturing comprise three or more anchoring feet configured to connect respectively, if three, to three anchoring elements having corresponding anchoring points at vertices of an equilateral triangle, or, if more than three, to an equal number of said anchoring elements having anchoring points at vertices of a regular polygon.

21. The method according to claim 19, wherein each of said anchoring feet belongs to said unit of support/manufacturing and rotate with respect to a body of said unit of support/manufacturing when said unit of support/manufacturing rotates about said anchoring point.

22. A bench for support and manufacturing of parts comprising:
    at least one unit of support/manufacturing, said unit of support/manufacturing moving on a support base, said support base comprising a series of protrusions distributed according to a certain order, a network of channels being defined between said protrusions, said channels being in communication with openings in said support base,
    wherein said unit of support/manufacturing comprises:
    a frame on which anchoring members configured to anchor said unit of support/manufacturing to said support base are mounted, said frame further comprising a repositioning system configured to reposition said unit of support/manufacturing on said support base, said repositioning system being further configured to cooperate with extremities of said protrusions on said support base such to generate actions for motion and repositioning of said unit of support/manufacturing, the support base having a surface that is defined;
    a number of anchoring points distributed on said support base according to a predefined geometry;
    said unit of support/manufacturing being movable independently from other units of support/manufacturing on the surface of said support base;
    said unit of support/manufacturing having a frame with at least two anchoring feet, each of said anchoring feet comprising an anchoring device configured to be activated/deactivated, said anchoring device being further configured to cooperate with a corresponding anchoring organ belonging to one of a plurality of anchoring elements;
    said anchoring elements being distributed on the surface of said support base such that each of said anchoring elements is positioned at one of said anchoring points;
    said anchoring points and the corresponding anchoring elements being distributed on the surface of said support base according to a geometry such that a distance between any one of said anchoring points, and a corresponding anchoring element, from any other of said anchoring points, and corresponding anchoring organ, in an immediate vicinity of an anchoring point and corresponding anchoring organ, is constant and equal to a radius of a predefined circle;
    anchoring devices of said at least two anchoring feet having a distance between each other equal to said radius; and
    said anchoring feet being configured to turn through a rotation with respect to the frame of the unit of support/manufacturing, said rotation being about an axis through any of said anchoring points and orthogonal to said support base, the corresponding anchoring feet being engaged to said anchoring point, and
    wherein said unit of support/manufacturing comprises devices for actuation of an angular displacement of said anchoring feet and anchoring devices operating an activation/deactivation of said anchoring organs belonging to the corresponding anchoring feet for connection/disconnection to the anchoring organs belonging to the corresponding anchoring elements, anti-rotation elements being provided to constrain a relative rotation of an anchoring foot with respect to the corresponding anchoring element, an axis of the constrained rotation being the axis about which said frame of said unit of support/manufacturing rotates with respect to said support base,
    such that a rotation of any unit of the at least one unit of support/manufacturing about an axis through one of said anchoring points, where one of said anchoring feet is connected to the corresponding anchoring element, causes a rotation of the at least one additional anchoring foot present in said unit of support/manufacturing and said at least one additional anchoring foot is moved at one anchoring element corresponding to one of the said anchoring points immediately adjacent to said anchoring point at which said unit of support/manufacturing is connected,
    thereby causing said at least one additional anchoring foot to connect to said anchoring element corresponding to one of the said anchoring points immediately adjacent to said anchoring point, at which said unit of support/manufacturing is connected.

* * * * *